(12) United States Patent
Nagy et al.

(10) Patent No.: US 6,471,016 B1
(45) Date of Patent: Oct. 29, 2002

(54) VIBRATION DAMPER FOR A HYDRAULIC BRAKE SYSTEM OF A VEHICLE

(75) Inventors: Imre Nagy, Eching; Ernst Maier, Markt Schwaben, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/958,300
(22) PCT Filed: Jan. 13, 2001
(86) PCT No.: PCT/EP01/00371
§ 371 (c)(1), (2), (4) Date: Oct. 9, 2001
(87) PCT Pub. No.: WO01/59319
PCT Pub. Date: Aug. 16, 2001

(30) Foreign Application Priority Data

Feb. 9, 2000 (DE) .......................... 100 05 588

(51) Int. Cl.[7] .............................................. F16D 65/16
(52) U.S. Cl. ...................... 188/72.4; 303/87; 188/73.37
(58) Field of Search ............................ 188/72.4, 73.35, 188/73.36, 73.37; 303/87

(56) References Cited

U.S. PATENT DOCUMENTS 5,205,309 A  4/1993  Cardenas et al.
5,540,486 A  7/1996  Linkner
5,718,488 A * 2/1998  Schneider et al. ............ 303/87
5,820,227 A * 10/1998 Sperd .......................... 303/87

FOREIGN PATENT DOCUMENTS

DE  4418701 A1  11/1995
DE  19544223 A1  6/1997

* cited by examiner

Primary Examiner—Matthew C. Graham
(74) Attorney, Agent, or Firm—Crowell & Moring LLP

(57) ABSTRACT

A vibration damper is provided for a hydraulic vehicle brake system with a diaphragm facing the hydraulic fluid that transmits the braking force and being fastened to a carrier device by its edge in such manner that it is able to move toward the carrier device or away from it at least slightly in its center area. The hollow chamber between the diaphragm and the carrier device, which is required for the movement of the diaphragm, has been largely evacuated. The stiffness of the diaphragm is preferably selected in such a manner that the diaphragm rests completely against the surface of the carrier device facing toward it at a pressure of the hydraulic fluid in the range of 25 bar and more. In some areas, the diaphragm can have a wave-shape cross-sectional design as can the surface of the carrier device facing toward the diaphragm. In a preferred version, the carrier device is a brake piston that is incorporated in the caliper of a vehicle brake, against whose side that faces away from the hydraulic fluid a brake lining carrier rests.

16 Claims, 1 Drawing Sheet

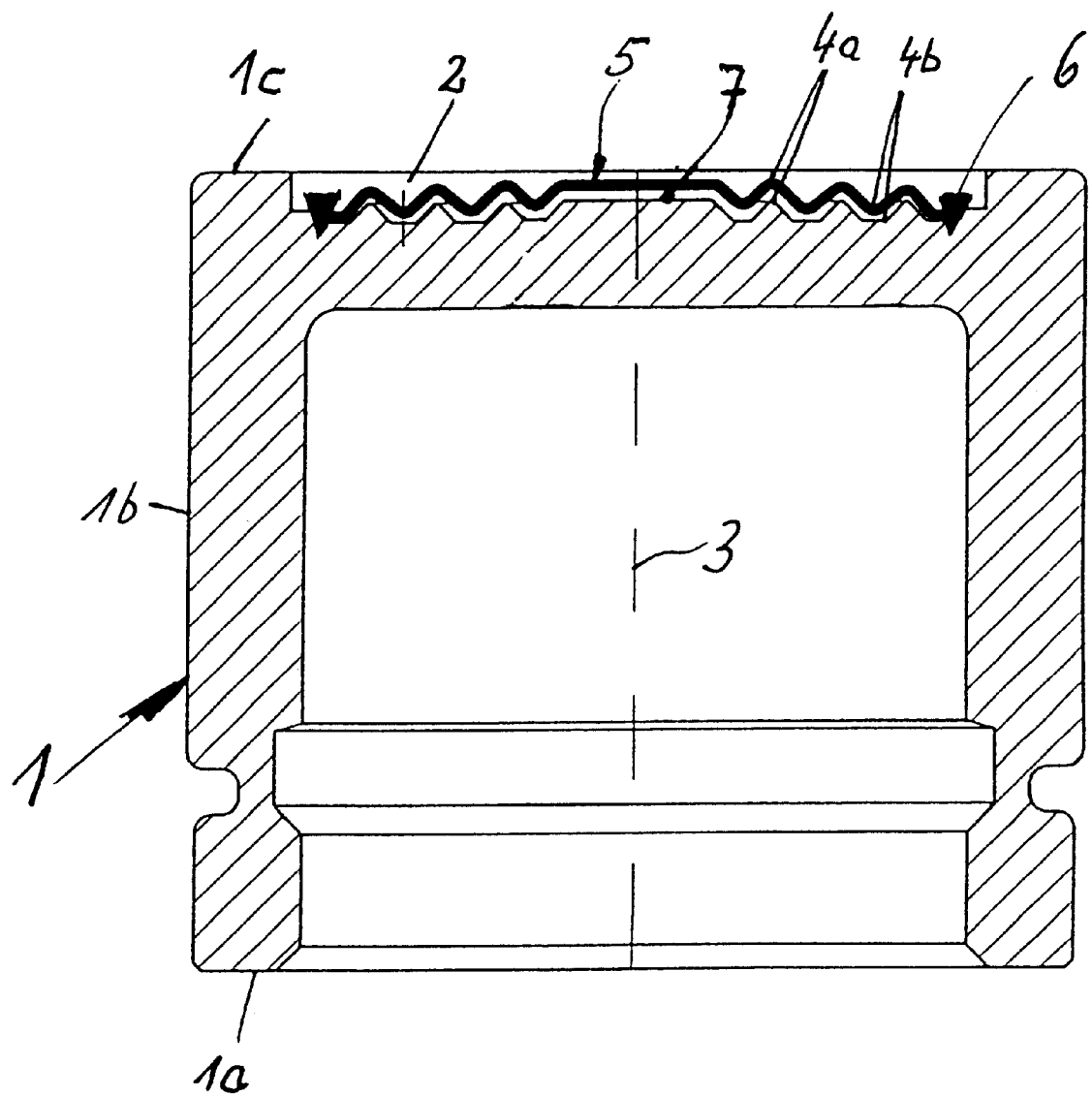

VIBRATION DAMPER FOR A HYDRAULIC BRAKE SYSTEM OF A VEHICLE

BACKGROUND AND SUMMARY OF THE INVENTION

The invention relates to a vibration damper for a hydraulic vehicle brake system with a diaphragm facing the hydraulic fluid that transmits the brake force and being connected to a carrier device by its edge in such manner that it is able to move toward the carrier device or away from it at least slightly in its center area. We would like to refer to DE 195 44 223 A1 for the known state of the art.

It may be required to provide a vibration in a generic hydraulic brake system in order to reduce undesirable vibration in the hydraulic system and/or prevent that small vibration generated by any kind of disruptive force increases to intolerable intensity. Such a vibration damper can also be described as "pressure smoothening device." For this purpose, for example, spring-loaded vibration dampers can be used, which however are very extensive.

A vibration damper as the one described in the above-mentioned publication, which is equipped with a housing or carrier device with a concave recess that is sealed by a disk-shaped diaphragm comprising a spring steel sheet, is considerably simpler. These diaphragms, which are fed on the outside with the hydraulic fluid of the brake system, is welded together with the carrier device on the edge, and the hollow chamber between the diaphragm and the above-mentioned recess is filled with air. Pressure vibration generated in the hydraulic system causes the diaphragm to move into the hollow chamber with its central area and then move away again from the carrier device, which can have a vibration damping effect if appropriately designed.

It has been proven that, in particular, when the diaphragm is relatively thin and therefore weak it can rupture in the most unfavorable case so that the air from the hollow chamber between the diaphragm and the carrier device can reach the hydraulic system. Air pockets in the hydraulic system of a hydraulic vehicle brake system however are known to be extremely undesirable because this can cause a soft braking actuation, caused by the compression of the trapped air.

A task of the present invention is presenting a remedial measure for the described problem. A solution of this task is characterized by the fact that the hollow chamber between the diaphragm and the carrier device that is required for the diaphragm movement is largely evaluated. Beneficial embodiments and further developments are the contents of the sub-claims.

In accordance with certain preferred embodiments of the invention, the mentioned hollow chamber between the diaphragm and the carrier device contains basically a vacuum so that in the case of a destruction of the diaphragm, which cannot be excluded one hundred percent although it is undesirable, no air can reach the hydraulic system. Of course, the vibration damper is no longer functional once the diaphragm has been destroyed, however at least the brake system is not impaired in its function. The vibrations, which can no longer be damped with a destroyed diaphragm, only lead to a loss of comfort because these vibrations can be transmitted onto the chassis of the vehicle, e.g. a passenger car, in the most unfavorable case.

It has been proven that a vibration damper in the hydraulic system of a vehicle brake system can become particularly necessary when the brake pressure in the hydraulic fluid is not too high, i.e. in the range of 5 bar to 20 bar. In order to achieve effective damping, the diaphragm should be relatively thin and flexible. The vacuum existing on the side of the diaphragm facing away from the hydraulic fluid is also beneficial in light of this aspect since this way the vibration damper can take effect already starting at an absolute pressure of 1 bar. In order to prevent the diaphragm from being destroyed at higher brake pressure—it can increase up to about 200 bar—the relevant dimensions of the vibration damper can have such a design and the stiffness of the diaphragm be selected in such a way that the diaphragm rests completely against the surface of the carrier device facing toward it at a pressure in the range of 25 bar and more of the hydraulic fluid.

The surface affecting the desired effect, i.e. vibration damping, can therefore be enlarged e.g. with specified dimensions of the carrier device and thus the damping effect can be increased if the diaphragm has a waved or undulated shape in some areas. In order to prevent a destruction of the diaphragm as well, caused by exceptionally high hydraulic pressure, even with such a diaphragm design, the surface of the carrier surface facing toward this area of the diaphragm can have a similar cross-sectional, i.e. basically synchronous, design. For firmness reasons it may be recommended with such a diaphragm design to select the geometric dimensions in such a manner that the distance between the diaphragm without hydraulic pressure and the surface of the carrier device facing toward the diaphragm in the edge area of the diaphragm away from the fastening section (with which it is fastened to the carrier device) is smaller than in the central diaphragm area.

In accordance with a beneficial combination of functions, the carrier device can be a brake piston provided in the caliper of a vehicle brake, against whose side that faces away from the hydraulic fluid a brake lining carrier rests. Such a vibration damper for a hydraulic vehicle brake system is shown as a preferred embodiment of the invention in the only attached FIGURE in a cross-sectional view and is described briefly in the following.

BRIEF DESCRIPTION OF THE DRAWING

FIG. 1 shows a cross-sectional view of a preferred embodiment of the invention.

DETAILED DESCRIPTION OF THE DRAWING

The so-called carrier device, which here at the same time is the brake piston provided in the caliper of the otherwise conventional vehicle brake system, of the vibration damper is marked with the designation 1. Against the front side 1a (the lower one shown in the FIGURE) of this cylindrical brake piston 1 or carrier device 1, which runs in a cylinder that is not shown with its cylinder shell area 1b and can be moved, rests as usual a brake lining carrier (not shown in the FIGURE). The front side 1c (here the upper one) opposite the front side 1a (here the lower one) is fed in the conventional manner with the hydraulic fluid that transmits the brake force.

On the front side 1c a circular indentation 2 is provided in the carrier device 1, which has at least a slightly concave design, i.e. the indentation 2 is lower in the area of the central axis 3 of the carrier device and/or further offset against the front side 1c of the carrier device 1 than at its edge. Furthermore—as the FIGURE shows—the surface of the carrier device 1 within this indentation 2 partially has a wave shape design. Since this—as already mentioned—involves a circular indentation 2 in the cylindrical carrier device 1, the wave peaks 4a and/or the wave valleys 4b of this wave-shaped surface, of course, also define circles. (In the case of a carrier device 1 that is produced in an extrusion process, this outline can be incorporated in during the manufacturing process).

Additionally, a largely circular diaphragm 5 is provided, which is fastened by its edge to the carrier device 1 and/or to its front side 1c in the area of the indentation 2 in such a manner that this diaphragm 5 can move at least slightly toward the carrier device 1, i.e. toward its front side 1c or away from it, with its area in the central axis 3. At its edge the diaphragm 5 is preferably fastened to the carrier device 1 through a welded seam 6 that has been generated through an electron beam welding process.

If no or basically no force is applied to the surface of the diaphragm 5 that is freely accessible from the outside, i.e. the surface facing toward the hydraulic medium of the brake system, then the diaphragm 5 is located at a distance from the surface of the carrier device 1 away from its fastening area and/or fastening section, i.e. away from the welding seam 6. Between the diaphragm 5 and the carrier device 1 a hollow chamber is located, which is largely evacuated, i.e. in this hollow chamber 7 basically a vacuum exists.

The area or section of the diaphragm 5 located in the wave-shaped area of the indentation 2 also has a wave shape and is adjusted to wave shape of the surface of the carrier device 1 in the area of the indentation 2. The wave shape, which is quite visible in the cross-section of the diaphragm 5, runs parallel to that of the surface of the carrier device, i.e. these two components practically have a synchronous wave shape toward each other in such a manner that the wave valleys 4b as well as the wave peaks 4a each rest on top of each other.

As far as the dimension of the evacuated hollow chamber 7 is concerned, which is largely determined by the concavity of the surface of the carrier device 1 in the area of the indentation 2, the distance (measured in the vertical direction in the FIGURE shown) between the diaphragm 5 that is not fed hydraulic pressure and the surface of the carrier device 1 facing toward it in the edge area of the diaphragm 5 away from its fastening section (i.e. away from the welding seam 6) is smaller than in the central area of the diaphragm 5, i.e. in the environment of the central axis 3.

Vibrations in the hydraulic system of the vehicle brake system that affect the front side 1c of the carrier device 1 and thus also the diaphragm 5 can only be damped successfully with the vibration damper that is formed by this diaphragm 5 and the evacuated hollow chamber 7 behind it as long as this diaphragm 5 is pressed continuously against the surface of the carrier device from the hydraulic pressure. If, however, the hydraulic pressure is lower than this value, then the pressure vibrations in the hydraulic system will try to get the diaphragm 5 to vibrate at least in its central area, i.e. from a time point of view the diaphragm 5 will move alternately toward the carrier device surface and away from it. Upon suitable coordination of the relevant dimensions this can result in an effective vibration damper. E.g. the thickness of the diaphragm 5 that consists for example of nickel steel or NiBe can be in the range of 0.4 mm to 0.7 mm.

In a beneficial version, such a vibration damper will only be activated in the actually required range of the (variable) pressure that exists in the hydraulic system, e.g. in the range of about 2 bar to about 20 bar. In the case of higher hydraulic pressure, the diaphragm 5 rests completely on the carrier device 1 so that no influence on the braking behavior of the overall system must be feared. If the diaphragm 5 is destroyed, beneficially no air will be able to reach the hydraulic system, however it should be pointed out that the design can certainly include a plurality of details that deviate from the example shown in the embodiment without deviating from the contents of the patent claims.

What is claimed is:

1. Vibration damper for a hydraulic vehicle brake system, comprising a diaphragm facing hydraulic fluid that transmits braking force and being fastened to a carrier device by an edge in such manner that the diaphragm is able to move toward or away from the carrier device at least slightly in a center area, wherein a hollow chamber between the diaphragm and the carrier device that is required for movement of the diaphragm is substantially evacuated.

2. Vibration damper according to claim 1, wherein a stiffness of the diaphragm is selected in such a manner that the diaphragm rests against a surface of the carrier device facing toward the diaphragm at a pressure of the hydraulic fluid above 25 bar.

3. Vibration damper according to claim 2, wherein in areas, the diaphragm has a wave shape in a cross-section as does, in the areas, the surface of the carrier device that faces toward the diaphragm.

4. Vibration damper according to claim 2, wherein the distance between the diaphragm to which no hydraulic pressure is applied and the surface of the carrier device facing toward the diaphragm in an edge area of the diaphragm away from a fastening section is smaller than in the central diaphragm area.

5. Vibration damper according to claim 2, wherein the carrier device is a brake piston that is incorporated in a caliper of a vehicle brake, against a side of the carrier device, facing away from the hydraulic fluid, a brake lining carrier rests.

6. Vibration damper according to claim 1, wherein in areas, the diaphragm has a wave shape in a cross-section as does, in the areas, the surface of the carrier device that faces toward the diaphragm.

7. Vibration damper according to claim 6, wherein the distance between the diaphragm to which no hydraulic pressure is applied and the surface of the carrier device facing toward the diaphragm in an edge area of the diaphragm away from a fastening section is smaller than in the central diaphragm area.

8. Vibration damper according to claim 6, wherein the carrier device is a brake piston that is incorporated in a caliper of a vehicle brake, against a side of the carrier device, facing away from the hydraulic fluid, a brake lining carrier rests.

9. Vibration damper according to claim 1, wherein the distance between the diaphragm to which no hydraulic pressure is applied and the surface of the carrier device facing toward the diaphragm in an edge area of the diaphragm away from a fastening section is smaller than in the central diaphragm area.

10. Vibration damper according to claim 9, wherein the carrier device is a brake piston that is incorporated in a caliper of a vehicle brake, against a side of the carrier device, facing away from the hydraulic fluid, a brake lining carrier rests.

11. Vibration damper according to claim 1, wherein the carrier device is a brake piston that is incorporated in a caliper of a vehicle brake, against a side of the carrier device, facing away from the hydraulic fluid, a brake lining carrier rests.

12. A method of making a vibration damper for a hydraulic brake system of a vehicle, comprising:

fastening a diaphragm facing hydraulic fluid that transmits a braking force to a carrier device by an edge of the diagram so that the diaphragm is movable toward or away from the carrier device in a central area, and substantially evacuating a hollow chamber between the diaphragm and the carrier device.

13. A method according to claim 12, wherein a stiffness of the diaphragm is selected so that the diaphragm rests against a surface of the carrier device at a pressure above 25 bar for the hydraulic fluid.

14. A method according to claim 12, wherein the thickness of the hollow chamber is greater in the central area than in areas adjacent the edge.

15. A hydraulic brake system assembly for a vehicle, comprising:

a carrier device, and a diaphragm arranged to face hydraulic fluid and fastened to the carrier device by an edge of the diaphragm so that at least a central area of the diaphragm is slightly movable, wherein a hollow chamber formed between the diaphragm and a surface of the carrier device to allow movement of the diaphragm is substantially evacuated.

16. A hydraulic brake system assembly according to claim 15, further comprising a caliper of a vehicle brake incorporating a brake piston including the carrier device and a brake lining carrier resting against a side of the carrier device facing away from the hydraulic fluid.

* * * * *